United States Patent [19]

Greene

[11] 3,838,656
[45] Oct. 1, 1974

[54] MARINE AUTOMATIC PILOT RUDDER MOTOR CONTROL SYSTEM

[75] Inventor: Leonard M. Greene, Chappaqua, N.Y.

[73] Assignee: Safe Flight Instrument Corporation, White Plains, N.Y.

[22] Filed: Aug. 21, 1972

[21] Appl. No.: 282,459

[52] U.S. Cl............. 114/144 R, 318/588, 318/634,
[51] Int. Cl. ..................... B63h 25/02, G05b 11/12
[58] Field of Search............... 114/144 R; 180/79.1; 244/50, 77 R, 77 B, 77 F, 77 DZ; 307/310; 330/23, 143; 340/228; 318/334, 472, 588, 619, 624, 634, 641 235/150.2

[56] References Cited
UNITED STATES PATENTS

| | | | |
|---|---|---|---|
| 3,505,577 | 4/1970 | Hirokawa | 114/144 R X |
| 3,517,285 | 6/1970 | Kundler | 244/77 DZ X |
| 3,527,991 | 9/1970 | Sackin | 318/634 |
| 3,604,907 | 9/1971 | Wesner | 114/144 R X |
| 3,656,043 | 4/1972 | Kawada et al. | 318/588 |
| 3,696,282 | 10/1972 | Hirokawa et al. | 114/144 R X |

Primary Examiner—Trygve M. Blix
Assistant Examiner—Stephen G. Kunin

[57] ABSTRACT

A system for controlling the sensitivity of rudder movement on a pleasure boat having an automatic pilot. The system includes apparatus for reducing the sensitivity of rudder responsiveness to error signals as wave motion and wind gusts increase.

5 Claims, 2 Drawing Figures

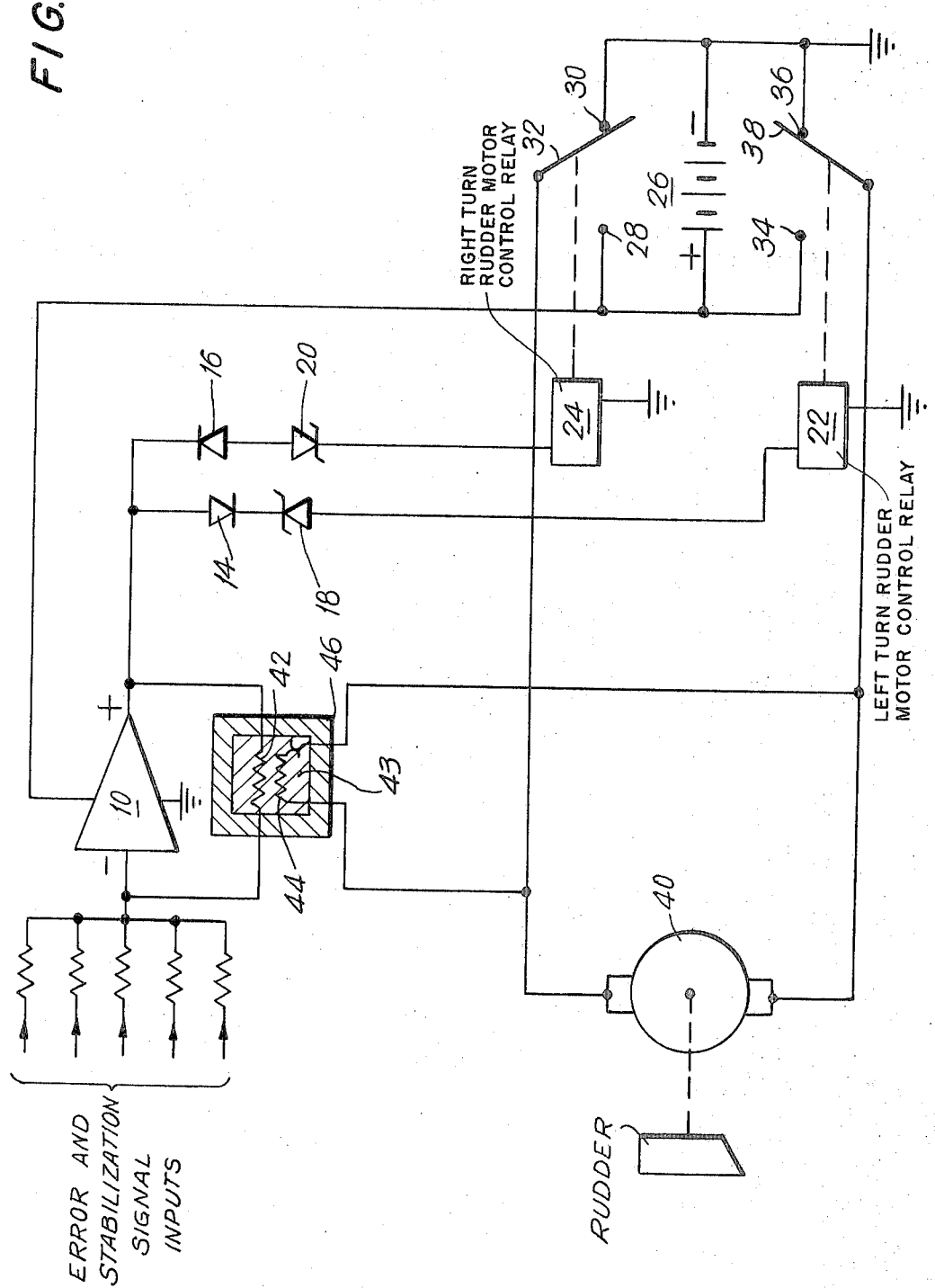

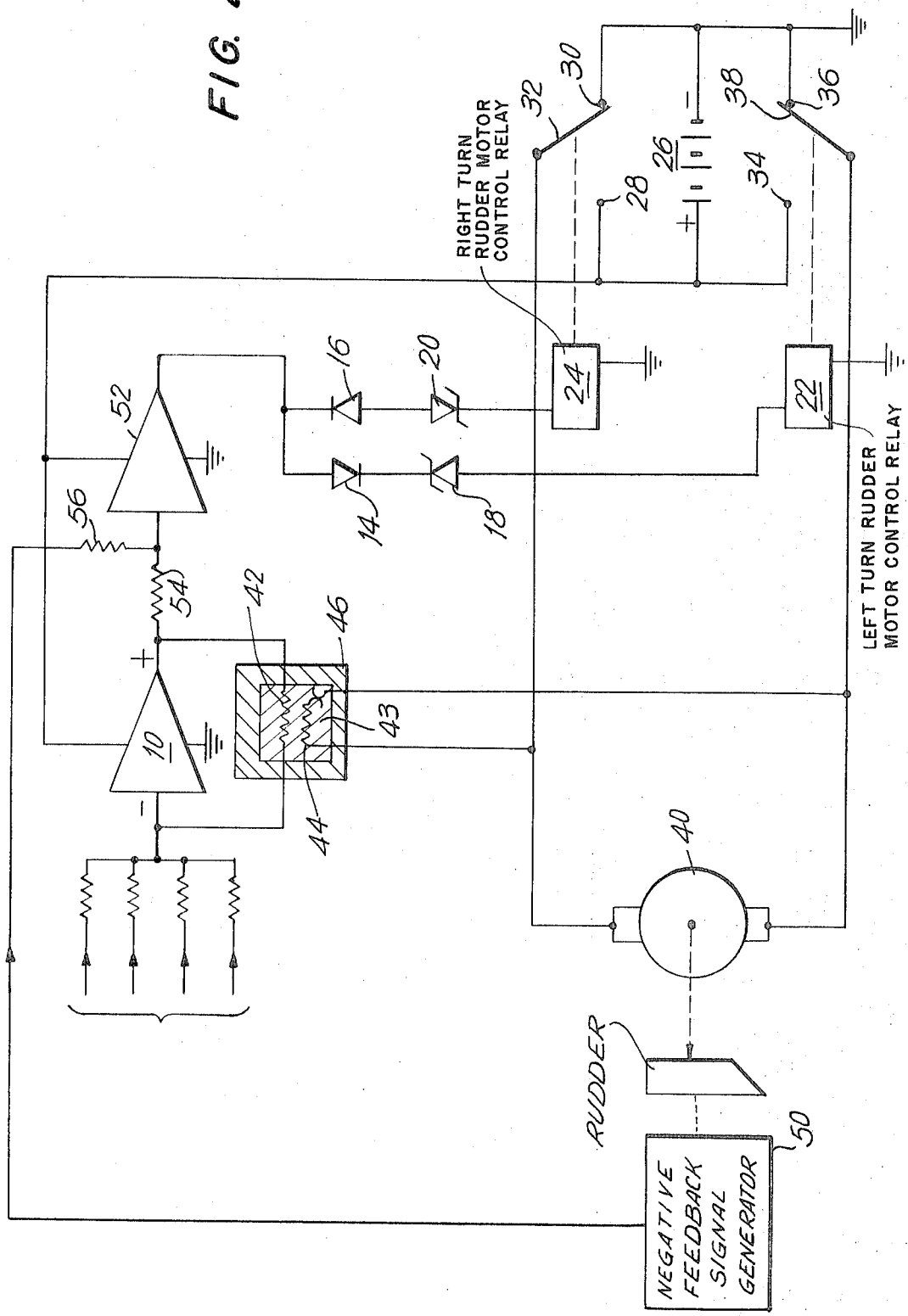

3,838,656

MARINE AUTOMATIC PILOT RUDDER MOTOR CONTROL SYSTEM

CROSS REFERENCE TO RELATED APPLICATIONS

Ser. No. 220,768 filed by Leonard M. Greene for AN AUTOMATIC PILOT FOR A SAILBOAT on Jan. 26, 1972.

BACKGROUND OF THE INVENTION

1. Field of the Invention

A system for regulating, in response to sea conditions, the sensitivity of rudder control on a pleasure boat having an automatic pilot.

2. Description of the Prior Art

Generally, on pleasure boats (e.g. sail or motor boats) having an automatic pilot, a motor is provided for controlling the movement of the rudder in response to a sensed error in the automatic pilot setting. In addition, in many of the larger and more expensive sailboats, automatic pilots control the operation of the rudder so that maximum efficiency is made of the wind for moving the sailboat in a specific heading.

It is desirable that rudder activity be reduced as wave motion and wind gusts increase. This is because as wave motion and wind gusts increase the automatic pilot more frequently causes the rudder motor to change the course of the pleasure boat in response to the changing conditions. Continued operation of the rudder motor is undesirable due to the resultant wear on the steering mechanism. A further disadvantage of continued operation of the rudder motor is that this results in an increase in the power required to operate the same. Additionally, the continued operation of the rudder motor moving the rudder alternately to the left and to the right gives the pleasure boat an unnecessary oscillatory movement which is bothersome to passengers.

SUMMARY OF THE INVENTION

1. Purposes of the Invention

It is an object of the present invention to provide improved means for use on a pleasure boat having an automatic pilot for controlling the operation of the rudder motor in response to sensed errors in the automatic pilot.

A still further object of the present invention is to provide for use on a pleasure boat having an automatic pilot means for decreasing rudder sensitivity to error signals in the automatic pilot as wind gusts and wave motion increase and vice versa.

2. Brief Description of the Invention

In accordance with the present invention the foregoing as well as other objects are accomplished on a pleasure boat having an automatic pilot by feeding error and stabilization signal inputs to an error signal amplifier. The error and stabilization signal inputs are derived from sensors which detect compass and relative wind deviations. A thermistor is in parallel with the error signal amplifier.

The output of the amplifier is connected to a first diode with a first zener diode being in series therewith. In series with the first zener diode is a left turn rudder motor control relay. The first diode and the first zener diode are arranged so that the zener diode conducts and the relay is energized upon the amplifier producing a positive signal of more than a specified magnitude.

Also connected to the output of the error signal amplifier is a second diode with a second zener diode being in series therewith. The second zener diode is in series with a right turn rudder motor control relay. The second diode and the second zener diode are arranged so that the second zener diode conducts causing the right turn rudder motor control relay to be energized when the amplifier produces a negative signal of more than a specified magnitdue.

A rudder motor is provided which controls the movement of the rudder on a pleasure boat. Energization of the left turn rudder motor control relay causes the rudder motor to rotate so as to move the rudder in a left direction. Energization of the right turn rudder motor control relay causes the rudder motor to move the rudder in a right direction.

A heating resistor is in parallel with the rudder motor and placed in heat transfer relationship to the thermistor so that heat generated by the heating resistor is transferred to the thermistor.

If no signal is directed to the error signal amplifier or if the output of the amplifier is less than a specified magnitude, neither of the zener diodes will conduct and the rudder motor will be inoperative holding the rudder stationary in a position so as not to change the pleasure boat heading.

If the output signal from the amplifier is of a sufficient magnitude and polarity to cause the first zener diode to conduct the left turn rudder motor control relay will cause the rudder motor to move the rudder in a left direction. After a short period of rudder motor operation the resistance of the thermistor decreases as a result of the heat generated by the heating resistor so that the gain of the error signal amplifier is reduced requiring larger input signals to the amplifier to cause either of the zener diodes to conduct.

When the rudder motor is inoperative and the thermistor is not at an elevated temperature as a result of recent continuous operation of the rudder motor, the gain of the amplifier is at a maximum so that there will be maximum response by the rudder to error signals caused by changes in wind and sea conditions.

Other embodiments are hereinafter described and further objects of the invention will be pointed out hereinafter.

The invention accordingly consists in the features of construction, combination of elements and arrangement of parts which will be exemplified in the marine automatic pilot rudder motor control systems hereinafter described and of which the scope of application will be indicated in the appended claims.

BRIEF DESCRIPTION OF THE DRAWINGS

In the drawings:

FIG. 1 is a schematic illustration of an embodiment of the present invention; and FIG. 2 is a schematic illustration of a further embodiment of the present invention.

DESCRIPTION OF THE PREFERRED EMBODIMENT

In FIG. 1 a schematic illustration of the present invention is shown and includes an error signal electrical amplifier 10. The particular means for furnishing error and stabilization signal inputs to the error signal amplifier responsive to wind and compass deviations is not a part of the present invention. However, it is noted that in my copending patent application, mentioned above, supra, means are described for sensing wind and compass deviations and providing error signals indicative thereof.

The output of error signal amplifier 10 is connected to the anode of a first blocking diode 14 and the cathode of a second blocking diode 16. A zener diode 18 is provided and has its cathode connected to the cathode of diode 14. A further zener diode 20 is provided with its anode connected to the anode of diode 16.

One end of left turn rudder motor control relay winding 22 is connected to the anode of zener diode 18 and one end of right turn rudder motor control relay winding 24 is connected to the cathode of zener diode 20. The respective opposite ends of both relay windings 22 and 24 are grounded as is shown in FIG. 1.

A D.C. source of potential 26 is provided with the positive terminal thereof connected to error signal amplifier 10. The negative terminal of source of potential 26 is grounded. Also connected to the positive terminal of source of potential 26 is a switch terminal 28, while a mating switch terminal 30 is in circuit with the negative terminal of source of potential 26. A relay contact blade 32 is provided and is in contact with terminal 30 when there is no current flowing through relay winding 24. However, when an energizing current flows through relay winding 24 its associated relay contact blade 32 is placed in contact with terminal 28.

A switch terminal 34 is electrically connected to the positive terminal of source of potential 26 while a mating switch terminal 36 is connected to the negative terminal of source 26. A movable relay contact blade 38 is provided and is in contact with switch terminal 36 when relay winding 22 is deenergized. When left turn rudder motor control relay winding 22 is energized, relay contact blade 38 is placed in contact with terminal 34.

The means for moving contact blades 32 and 38 in response to respective relay windings 24 and 22 being energized are conventional and will be apparent to those having ordinary skill in the art.

A reversible drive rudder motor 40 is provided and controls the movement of the rudder on a pleasure boat having an automatic pilot. Contact blade 32 is in circuit with one terminal of rudder motor 40 and contact blade 38 is in circuit with the other terminal of rudder motor 40.

A feedback thermistor 42 is in parallel with error signal amplifier 10. A heating resistor 44 is in parallel with rudder motor 40. Heating resistor 44 is in close proximity to thermistor 42 and is thermally coupled thereto by placing a thermal conducting electrical insulating material 43 between heating resistor 44 and thermistor 42. Suitable thermal conducting electrical insulating materials are well known in the art and typical ones useful in the practice of the present invention are silicate cement, silicone grease or berylia. The actual relative spacing of resistor 44 with respect to thermistor 42 depends on the required degree of thermal coupling therebetween and materials selected as will be apparent to one who is of ordinary skill in the art.

A thermal insulating housing 46 encloses and surrounds thermistor 42, heating resistor 44 and the thermal conducting electrical insulating material 43. It should be noted that housing 46 is a thermal insulator relative to material 43 but is still capable of dissipating heat. The particular heat insulating material 46 which is utilized can be conventional, and materials that may be used are epoxy, silicone rubber, alumina-silica-chromia fibres with a phenolic binder. Other materials that can be used will be apparent to those skilled in the art.

Initially when rudder motor 40 is not activated and an error signal of sufficient magnitude is applied to error signal amplifier 10 such that its positive output signal exceeds the voltage breakdown of zener diode 18 said zener diode conducts and current flows therethrough. When this occurs left turn rudder motor control relay winding 22 is energized and its associated relay contact 38 moves from switch terminal 36 so as to be in circuit with switch terminal 34. A voltage is thus applied across rudder motor 40 to cause motor 40 to rotate in a direction to move the rudder to the left. A stop controls the amount of rotation of the rudder motor in both directions and hence the amount of rotation of the rudder in both the left and right direction. While motor 40 is activated, current flows through thermistor 42 causing the same to slightly heat up. However, the heat generated by the thermistor is relatively small and insignificant insofar as the functioning of the present invention is concerned. The heat generated by heating resistor 44 is transferred to thermistor 42 via material 43 and after a relatively brief period of time decreases the resistance of the thermistor 42 so that the gain of error signal amplifier 10 is decreased. The period of time to decrease the resistance of thermistor 42 so as to reduce the gain of amplifier 10 is determined by the rating of resistor 44 and the rating of thermistor 42 as well as the thermal properties of material 43 and housing 46. A reduction in the gain of the error signal amplifier has the effect of requiring larger signal inputs to the amplifier to cause either of the zener diodes to conduct and activate the rudder motor. Thus rudder movement in response to error signals received by amplifier 10 is reduced when the rudder motor is activated for a sufficient recent period of time so that the resistance of thermistor 42 has been significantly reduced as a result of heat generated by heating resistor 44.

If the input to error signal amplifier 10 drops below a specified positive magnitude with this magnitude determined by the gain of the error signal amplifier which is a function of the resistance of thermistor 42, then the output voltage of said amplifier will no longer be sufficient to cause zener diode 18 to conduct. Left turn rudder motor control relay winding 22 will become deenergized and relay contact 38 moves from terminal 34 to terminal 36 so as to deactivate rudder motor 40. Heating resistor 44 no longer generates heat and the temperature of the thermistor 42 slowly decreases as a result of the dissipation of heat from said thermistor and from heating resistor 44 through housing 46.

The movement of the rudder is most sensitive to changes in sea conditions when the rudder motor is off and has not been operating recently so that thermistor 42 is not at an elevated temperature. In any event, there is a minimum deadband in which neither zener diode will conduct unless the output of amplifier 10 is at least a specific magnitude as determined by the ratings of the zener diodes which preferably are the same.

If a signal is received by error signal amplifier 10 of a sufficient magnitude and having a negative polarity so that the error signal amplifier will produce a negative signal of more than a predetermined magnitude as determined by the then gain of the amplifier, zener diode 20 will conduct and right turn rudder motor control relay winding 24 will be energized causing motor 40 to operate to move the rudder to the right. The system then operates in a manner analogous to that previously described.

By judiciously choosing the heat insulating capabilities of housing 46, the rate of dissipation of heat from thermistor 42 and heating resistor 44 can be controlled to obtain desired system characteristics. Additionally, by choosing material 43 to have a specified heat conductivity the characteristics of the system can also be controlled.

It is noted that heating resistor 44, thermistor 42, material 43 and housing 46 together perform an integrating function in that the heat generated by heating resistor 44 which controls the temperature of thermistor 42 is a function of the duration and frequency of operation of rudder motor 40.

A thermostat can be included within housing 46 to limit the maximum temperature of thermistor 42 and set a maximum deadband, i.e. minimum sensitivity.

An important advantage of using the present invention is that the drain on the rudder motor battery is minimized since the rudder motor is not continually operated. Additionally, there is less strain on the rudder motor, rudder and other steering elements.

In FIG. 2 of the drawings a modified form of the present invention is shown and like parts in both figures are identified by the same reference numeral. In the FIG. 2 embodiment a negative feedback signal generator 50 is electrically coupled to the rudder movement and operated to produce a negative feedback signal responsive to the dynamic movement of the rudder. One type of generator that could be employed is disclosed in my copending patent application identified above, supra. A second amplifier 52 is provided which is in series with the output of amplifier 10 via a resistor 54. The output of amplifier 52 is connected to blocking diodes 14 and 16. Power for amplifier 52 is supplied from the positive terminal of battery 26.

Negative feedback signal generator 50 is connected via a coupling resistor 56 to the input of amplifier 52 so that the negative rudder feedback signal bypasses amplifier 10. The reason for doing this is to maintain good dynamic stability of the rudder independently of the gain of amplifier 10 which is dependent on rudder activity. If the output signal from negative feedback signal generator 50 were directed to amplifier 10 then the dynamic stability of the rudder might be detrimentally affected by the deadband level formed in response to rudder movement.

The operation of the embodiment of the invention shown in FIG. 2 is identical to that described in conjunction with FIG. 1 except that the negative rudder feedback signal bypasses amplifier 10 and is applied directly to the input of amplifier 52 with the output of amplifier 10 also applied to the input of amplifier 52.

It thus will be seen that there is provided automatic pilot rudder motor control systems which achieve the various objects of the invention and which are well adapted to meet the conditions of practical use.

As various possible embodiments might be made of the above invention, and as various changes might be made in the embodiments above set forth, it is to be understood that all matter herein described or shown in the accompanying drawings is to be interpreted as illustrative and not in a limiting sense.

Having thus described the invention there is claimed as new and desired to be secured by Letters Patent:

1. A system for controlling the sensitivity of a rudder on a pleasure boat having an automatic pilot in response to the frequency and duration of error signals comprising a first amplifying means for receiving error and stabilization signal inputs, a second amplifying means, means connecting said first amplifying means to said second amplifying means, a first blocking diode, means connecting said second amplifying means to said first blocking diode, a first and second rudder motor control means, means connecting said first blocking diode to said first rudder motor control means, a second blocking diode, means connecting said second amplifying means to said second blocking diode, means connecting said second blocking diode to said second rudder motor control means, a rudder motor, the direction of rotation of said rudder motor controlled by said first rudder motor control means and said second rudder control means, a rudder operated by said rudder motor, a negative feedback signal generator electrically coupled to the rudder and producing a negative feedback signal responsive to the dynamic movement of the rudder, means connecting said negative feedback signal generator to said means connecting said first amplifying means to said second amplifying means, and means responsive to the activation of said rudder motor and coupled to said first amplifying means for controlling the gain thereof and the sensitivity of the movement of the rudder in response to the frequency and duration of error signals received by the amplifying means.

2. A system according to claim 1 wherein said responsive means includes feedback means for said first amplifying means, said feedback means including a heating resistor in parallel with said rudder motor, a feedback thermistor thermally coupled to said heating resistor and electrically connected to said first amplifying means.

3. A system according to claim 1 wherein a first zener diode is interposed on said means connecting said first blocking diode to said first rudder motor control means with the anode of said first blocking diode being connected to said second amplifying means, the cathode of said first blocking diode being connected to the cathode of the first zener diode and the anode of said first zener diode being connected to said second rudder motor control means.

4. A system according to claim 3 further including a second zener diode interposed on said means connecting said second blocking diode to said second rudder motor control means, the anode of said second zener diode being connected to the anode of said second blocking diode, the cathode of said second blocking diode being connected to said second amplifying means and the cathode of said second zener diode being connected to said right turn rudder motor control relay means.

5. A system according to claim 1 wherein said first amplifying means comprises an electrical amplifier, said responsive means including a feedback means, said feedback means including an element whose resistance decreases upon being heated and is connected to said first amplifying means, a heating resistor in circuit with said rudder motor and thermally coupled to said element.

* * * * *